(12) United States Patent
Goto et al.

(10) Patent No.: US 8,652,558 B2
(45) Date of Patent: Feb. 18, 2014

(54) CREAM COMPOSITION

(75) Inventors: Takaki Goto, Ichinomiya (JP); Seiichiro Ikeda, Ichinomiya (JP); Kumiko Hiramatsu, Ichinomiya (JP)

(73) Assignee: Pokka Corporation, Aichi (JP)

( * ) Notice: Subject to any disclaimer, the term of this patent is extended or adjusted under 35 U.S.C. 154(b) by 0 days.

(21) Appl. No.: 13/452,440

(22) Filed: Apr. 20, 2012

(65) Prior Publication Data

US 2012/0207908 A1 Aug. 16, 2012

Related U.S. Application Data

(63) Continuation of application No. 12/293,320, filed as application No. PCT/JP2007/056900 on Mar. 29, 2007, now abandoned.

(30) Foreign Application Priority Data

| Mar. 31, 2006 | (JP) | 2006-099747 |
| Oct. 30, 2006 | (JP) | 2006-294466 |
| Jan. 31, 2007 | (JP) | 2007-022333 |

(51) Int. Cl.
*A23C 13/00* (2006.01)

(52) U.S. Cl.
USPC ............ 426/586; 426/658; 426/100; 426/103

(58) Field of Classification Search
USPC ........................................ 426/658
See application file for complete search history.

(56) References Cited

U.S. PATENT DOCUMENTS

| 3,559,958 A | * | 2/1971 | Carpigiani | 366/336 |
| 3,993,793 A | * | 11/1976 | Finney | 426/565 |
| 4,146,652 A | | 3/1979 | Kahn et al. | |
| 4,808,334 A | * | 2/1989 | Ezaki et al. | 516/54 |
| 5,084,295 A | | 1/1992 | Whelan et al. | |
| 6,010,734 A | | 1/2000 | Whelan et al. | |

FOREIGN PATENT DOCUMENTS

| EP | 1366670 | * | 3/2003 |
| JP | 58-058136 | | 4/1983 |
| JP | 07-222565 | | 8/1995 |
| JP | 09-094061 | | 4/1997 |
| JP | 11-187836 | | 7/1999 |
| JP | 2003-259803 | | 9/2003 |
| JP | 2003-325147 | | 11/2003 |
| JP | 2005-278447 | | 10/2005 |

OTHER PUBLICATIONS

English Translation of Toshihiko: JP 07-222565 A ap.; Aug. 1995.
English Translation of Hasio: JP 11-187836 pub.; Jul. 1999.
Levy: Freezing Kinetics of a Model Oil-in-Water Emulsion under High Pressure or by Pressure Release. Impact on Ice Crystals and Oil Droplets; LWT—Food Science and Technology; vol. 32, issue 7, Nov. 1999, pp. 396-405; Received Mar. 15, 1999; Accepted May 18, 1999. Available online Apr. 12, 2002.
Mississippi Code of 1972: Codes, 1942, Sec. 4560-11; Laws, 1954, ch. 156, Sec. 1; 1971, ch. 361, Sec. 1; 1986, ch. 308, Sec. 1, eff from and after Jul. 1, 1986. Repeated by Laws 1999, Ch. 439, Sec. 2, eff. Jul. 1, 1999.
http://www.cosmeticsinfo.org/ingredient_details.php?ingredient_id=1963; printed Jan. 31, 2012.
International Search Report; PCT/JP2007/056900; Apr. 24, 2007; Yoshiko Kuwahara.
International Preliminary Report on Patentability (translation) for corresponding International Application No. PCT/JP2007/056900 (dated Sep. 30, 2008).
Office action issued Feb. 17, 2011 for Korea Patent Application No. 2008/7022124A, filed Sep. 10, 2008 (Korean Patent Publication No. 2009/003211A, published Jan. 9, 2009).

* cited by examiner

*Primary Examiner* — Patricia George
(74) *Attorney, Agent, or Firm* — Fish & Richardson P.C.

(57) ABSTRACT

Provided is a cream composition superior in handleability. The cream composition contains milk fat, a sugar, and water. The content of the milk fat is more than 5 mass % and 30 mass % or less. The content of the sugar is 40 to 65 mass %. The median diameter of the cream composition is 0.2 to 4.0 μm, and the viscosity of the cream composition at 20° C. is 100 to 2,500 mPa·s.

12 Claims, No Drawings

CREAM COMPOSITION

CROSS-REFERENCE TO RELATED APPLICATIONS

This application is a continuation of U.S. application Ser. No. 12/293,320, filed Sep. 17, 2009 (now pending), which is a National Stage filing of PCT/JP2007/056900, filed Mar. 29, 2007 (now expired), which claimed priority from each of Japanese Patent Application No. 2006-099747, filed Mar. 31, 2006, Japanese Patent Application No. 2006-0294466, filed Oct. 30, 2006, and Japanese Patent Application No. 2007-022333, filed Jan. 31, 2007. All referenced applications are incorporated herein by reference.

FIELD OF THE INVENTION

The present invention relates to a cream composition for use, for example, as an additive for coffee or cakes.

BACKGROUND OF THE INVENTION

Conventionally, cream compositions have been ingested widely, an additive for foods and drinks such as coffee as a coffee whitener. For example, Patent Document 1 (Japanese Laid-Open Patent Publication No. 2005-2784) discloses a condensed milk-diluted food containing sweetened condensed milk, a sucrose fatty acid ester, and a polysaccharide thickener. Patent Document 2 (Japanese Laid-Open Patent Publication No. 2003-325147) discloses foods and drinks containing a glycerol fatty acid ester, casein sodium, and coconut milk. Patent Document 3 (Japanese Laid-Open Patent Publication No. 2003-259803) discloses a condensed milk for addition to drinks containing a milk protein component and milk fat in amounts controlled over a particular range.

A requirement for a cream composition is that the milk fat be stable for an extended period of time and the cream composition be easy to handle, that is, the cream composition has favorable handleability. Specifically, cream compositions are normally transported in a frozen state. As a result, for example, when a cream composition is used in production for foods and drinks, there is a period needed for thawing the cream composition from the frozen state and the cream composition may be destabilized due to separation of water during thawing. In addition, great care should be given to temperature control during storage of the frozen cream composition.

SUMMARY OF THE INVENTION

An object of the present invention is to provide a cream composition having superior handleability.

An aspect of the present invention, which was made to achieve the object above, provides a cream composition, comprising milk fat, a sugar, and water, wherein the content of the milk fat is more than 5 mass % and 30 mass % or less, the content of the sugar is 40 to 65 mass %, the median diameter of the composition is 0.2 to 4.0 μm, and the viscosity of the composition at 20° C. is 100 to 2,500 mPa·s.

DETAILED DESCRIPTION OF THE PREFERRED EMBODIMENTS

Hereinafter, preferred embodiments of the cream composition according to the present invention will be described in detail. The cream composition in the present embodiment contains milk fat, a sugar, and water. The cream composition is liquid at least at normal temperature, and is ingested, for example, as it is added to coffee, cocoa, or tea drinks or to pudding, chocolate, or ice cream. The cream composition provides a whip cream, in combination with fresh cream or vegetable whip. The normal temperature is a temperature at which the cream composition is used normally, and, for example, 10 to 40° C. Such a cream composition is normally stored under a low temperature atmosphere, for example a refrigerating atmosphere (0 to 10° C.) or a freezing atmosphere (0° C. or lower, generally −18° C. or lower), for preservation of its quality for an extended period of time. The cream composition is preferably liquid under the low temperature atmospheres, because, if so, it can be used immediately without thawing after withdrawal from the low temperature atmosphere.

The cream composition has handleability. The convenience in handling the liquid cream composition derives from the flowability of the cream composition and the dispersion stability of the components dispersed in the cream composition. An excessively high flowability for the cream composition leads to leakage of the cream composition during metering or use. The cream composition is frozen when it is cooled to a freezing temperature, and such a frozen cream composition requires an additional period for thawing. It thus makes it difficult to handle the cream composition, leading to deterioration in the handleability of the cream composition. When the dispersion stability of the components dispersed in the cream composition is lower, the components may float or become sediment, disturbing the homogeneity in component distribution of the cream composition. Thus, the cream composition should be, for example, agitated during storage or use of the cream composition, which leads to deterioration in the handleability of the cream composition.

The milk fat is obtained by removing the components other than milk fat from milk. Examples of the milk include raw milk (cow's milk freshly prepared), milk (sterilized cow's milk), and special milk (adjusted cow's milk, for example, processed milk, nonfat milk, low-fat milk, fat-modified milk, calcium-fortified milk). The milk fat is dispersed in the cream composition as aggregates of multiple particles. The milk fat obtained by the method described above may be used in production of the cream composition, but alternatively, an ingredient containing milk fat may be used. The ingredient containing milk fat is preferably an ingredient containing it in a greater amount, and examples thereof include the creams (including high- and normal-fat creams) described in the "Standard Tables of Food Composition in Japan", 5th Ed., and dairy ingredients. Examples of the dairy ingredients include butter, whole milk powder, and adjusted milk powder. When a cream or a dairy ingredient is used, the cream composition contains milk fat and also the components derived from the cream or dairy ingredients such as carbohydrates, proteins, ash, and inorganic substances. Among them, use of a cream is preferable. The particles of the milk fat contained in cream are smaller than those contained, for example, in butter. Thus, it is easier to pulverize the milk fat particles during production of a cream composition, and thus to produce the cream composition.

The content of the milk fat in the cream composition is more than 5 mass % and 30 mass % or less, preferably 10 to 25 mass %. A milk fat content of 5 mass % or less leads to deterioration in the flowability of the cream composition, in parallel with the decrease in the milk fat content. A milk fat content of more than 30 mass % leads to drastic increase in the number of milk fat particles present in the cream composition, which in turn results in deterioration in dispersion stability of the milk fat because of aggregation of the particles and floatation of the milk fat.

Addition of the sugar, which leads to adjustment of the solid content of cream composition (total solid content), is effective for controlling the viscosity of the cream composition. The sugar is not particularly limited, as long as it is used commonly for food, and typical examples thereof include sucrose, isomerized sugar, fructose glucose liquid sugar, maltose, fructose, lactose (including lactose regarded as dairy ingredient), glucose, trehalose, reducing sugars, sugar alcohols (sorbitol, maltitol, erythritol, xylitol, etc.), honey, and stevia. These sugars may be used alone or in combination of two or more. Among them, sucrose is preferable, because it is cheaper and easily available.

The content of the sugar in the cream composition is 40 to 65 mass %, preferably 45 to 55 mass %. The content of the sugar exerts an influence on the solid content of the cream composition, which in turn influences the viscosity of the cream composition. Thus, a sugar content of less than 40 mass % leads to decrease of the solid content of cream composition and drastic decrease of the viscosity of cream composition, which results in deterioration in the dispersion stability of milk fat and floatation of the milk, deterioration in the flowability and the handleability of the cream composition. A sugar content of more than 65 mass % results in increase of the solid content of cream composition and significant increase in the viscosity of cream composition, which in turn leads to deterioration in the flowability and handleability of the cream composition. It also inhibits uniform mixing of the components in production of the cream composition, leading to deterioration in homogeneity of the component distribution in the cream composition.

Water functions as a solvent or a dispersant for other components.

The cream composition may contain a solvent or dispersant other than water as its additional component. In addition, the cream composition may contain at least one compound selected from emulsifiers, baking soda, milk, skim milk powder, whole milk powder, concentrated milk, degreasing condensed milk, whey, condensed milk, lactose, vegetable oil, dextrin, polysaccharide thickeners (carrageenan, etc.), starch, caramel (powder or extract), sodium glutamate, milk proteins (casein, casein sodium, etc.), flavoring agents, spice, herb, instant coffee, black tea, cocoa powder, cocoa butter, cacao mass, vegetable juice, vegetable paste, and antioxidants (vitamin C, vitamin E, etc.). The viscosity of the cream composition is adjusted properly by addition of such an ingredient to the cream composition. Specifically, when the cream composition is used together with a coffee or black tea drink, the cream composition may contain, for example, the flavor for the instant coffee or instant black tea. Alternatively, when the cream composition is used with a cocoa drink, chocolate, or pudding, the cream composition may contain, for example, cocoa powder, cocoa butter, or caramel powder. In addition, the cream composition may contain, for example, vegetable oil, butter, skim milk powder, or powdered whole milk, for prevention of the deterioration in flowability of the cream composition.

The emulsifier reduces aggregation of milk fat particles by coating the milk fat particles and improves the dispersion stability of the milk fat. The emulsifier is not particularly limited, if it is used commonly in foods, and typical examples thereof include glycerol fatty acid esters, sucrose fatty acid esters, sorbitan fatty acid esters, propylene glycol fatty acid esters, polysorbate, and lecithin. Typical examples of the glycerol fatty acid esters include polyglycerin esters, monoglycerides, organic acid monoglycerides, and diglycerin monofatty acid esters. These compounds may be used alone or in combination of two or more. It is also possible to decrease the viscosity of the cream composition by adding a properly selected emulsifier to the cream composition.

The content of the emulsifier in the cream composition may vary according to the milk fat content, but is preferably 0.5 to 1.0 mass %. An emulsifier content of less than 0.5 mass % may result in insufficient coating of the milk fat particles, and thus in deterioration in the dispersion stability of milk fat and the handleability of the cream composition. An emulsifier content of more than 1.0 mass % results in saturation of the improvement in the dispersion stability of milk fat.

Typical examples of the vegetable oils include palm oil, palm kernel oil, coconut oil, rapeseed oil, soy bean oil, cone oil, sesame oil, rice oil, olive oil, cottonseed oil, flaxseed oil, tung oil, and camellia oil. A processed vegetable oil, for example by hydrogenation, fractionation, or ester exchange, may be used as the vegetable oil. These vegetable oils may be used alone or in combination of two or more. The content of the vegetable oil is preferably 1 to 15 mass %. A vegetable oil content of more than 15 mass % may lead to excessive increase in the viscosity of the cream composition and also to deterioration in handleability. When such a vegetable oil is contained, it is preferably to use the emulsifier above for adjustment of the viscosity and improvement of the handleability of the cream composition. When a vegetable oil is added, the vegetable oil may be added after it is emulsified with an emulsifier.

The median diameter of the cream composition is 0.2 to 4.0 μm, preferably 0.5 to 3.0 μm, and more preferably 1.0 to 2.0 μm. The median diameter of the cream composition influences the dispersion stability of the components such as milk fat dispersed in the cream composition, and is dependent on the particle diameter of the milk fat particles. Thus, the particle diameter of the milk fat particles is very small at a median diameter of less than 0.2 μm, and it is not possible to preserve particles having such a small diameter for an extended period of time. The particle diameter of the milk fat particles becomes excessively large at a median diameter of more than 4.0 μm, resulting in deterioration in dispersion stability and floatation of the milk fat. As a result, the handleability of the cream composition deteriorates. The median diameter is determined by measuring the particle size distribution of the cream composition by laser diffraction/scattering method. At a median diameter of 0.5 to 3.0 μm, it is possible to improve the dispersion stability of milk fat and the handleability of cream composition under a temperature atmosphere, to which the cream composition is normally exposed, such as a normal-temperature or low-temperature atmosphere as above. When the median diameter is 0.5 to 3.0 μm, the median diameter of the cream composition immediately after production and that of the cream composition 4 weeks after production are almost the same as each other, under the normal- or low-temperature atmosphere, indicating that the median diameter immediately after production is preserved. Thus, the stability of the cream composition at a median diameter of 0.5 to 3.0 μm is high.

The viscosity of the cream composition at 20° C. is 100 to 2,500 mPa·s, preferably 200 to 1,000 mPa·s. A viscosity of less than 100 mPa·s leads to deterioration of the dispersion stability of milk fat, floatation or sedimentation of the milk fat, and deterioration in the handleability of cream composition. In addition, oxidation of the floating milk fat in contact with air leads to further deterioration in the quality of cream composition. The cream composition has an excessively high viscosity at a viscosity of more than 2,500 mPa·s, resulting in deterioration in the flowability and handleability of the cream composition. At a viscosity of 200 to 1,000 mPa·s, it is possible to prevent floatation or sedimentation of the milk fat under the normal- or low-temperature atmosphere above and improve the dispersion stability of milk fat and the handleability of cream composition.

The total amount of the solid components in the cream composition, i.e., the total solid content, is preferably 55 to 80 mass %, more preferably 60 to 78 mass %, and still more preferably 65 to 75 mass %. The viscosity of the cream composition decreases as the total solid content of the cream composition decreases, and increases as the total solid content increases. Accordingly, the cream composition has an excessively small viscosity at a total solid content of less than 55 mass %, leading to lower dispersion stability of milk fat and lower handleability of cream composition. The cream composition has an excessively high viscosity at a total solid content of more than 80 mass %, which may result in deterioration in the flowability and the handleability of the cream composition.

The cream composition is prepared according to the steps of preparation, homogenization, and sterilization. In the preparation step, the components above are blended and agitated, to obtain a cream composition. The order of adding the components in the step is not particularly limited. In the step, the milk fat particles are pulverized by agitation, and the milk fat is more dispersed in the cream composition. The components are agitated, for example, manually by operators or with a stirrer more rapidly than the manual agitation. The components are preferably agitated in a stirrer at a frequency of 1,000 rpm or more, for example at a frequency of 3,440 rpm, because the milk fat can be dispersed well. The stirrer is not particularly limited, if it has a function to emulsify or disperse the milk fat, and a typical example thereof is a tank equipped with a stirrer.

In the homogenization step, the cream composition prepared is homogenized in a homogenizer, and the milk fat particles are pulverized more finely and the milk fat dispersed to a greater degree. When the components are agitated at a frequency of 1,000 rpm or more in the preparation step, the milk fat particles are sufficiently fine, and thus, the homogenization step may be eliminated. On the other hand, when the cream composition contains the butter described above, because the particles of the milk fat contained in the butter are larger in size than those contained in the cream as described above, the cream composition is preferably homogenized sufficiently. In the sterilization step, the cream composition homogenized is sterilized by a known method such as heat sterilization. The pH of the cream composition after the sterilization step is preferably adjusted into the range of 6.4±0.4. For example, when the pH of the cream composition before the sterilization step is 6.5 or less, it is preferably to adjust the pH of the cream composition to more than 6.5 by adding, for example, baking soda to the cream composition.

Advantageous effects of the embodiment will be described below.

In the cream composition of the present embodiment, it is possible to improve the flowability of the cream composition and the dispersion stability of milk fat and also the handleability of the cream composition, by adjusting the contents of the sugar and the milk fat and the median diameter and viscosity of the cream composition in the ranges above. It is also possible to prevent the churning caused by vibration during transportation of the cream composition, because the cream composition has favorable dispersion stability of milk fat and a suitable viscosity. For that reason, the cream composition in the present embodiment is more compatible with long-term transportation than conventional cream compositions.

The milk fat particles in the present embodiment are pulverized by agitation in the preparation step and homogenization in the homogenization step. It is thus possible to improve the dispersion stability of milk fat and the handleability of cream composition by these treatments. However, if agitation of the components in the preparation step is insufficient and the homogenization step is eliminated, even when the milk fat particles are covered with an emulsifier and thus mutual binding is prevented, the milk fat may float or become sediment, leading to deterioration of the handleability of cream composition, because the diameter of the particles are larger than that in the present embodiment.

The milk fat and the sugar in the present embodiment are normally obtained from ingredients by processing. It is possible to prevent contamination of the milk fat and the sugar by microbes and also contamination of the cream composition using the ingredients by microbes, easily, for example, by sterilization during processing. It is possible to prevent contamination of the cream composition by microbes and proliferation of the microbes in contaminated cream composition more reliably, by producing the cream composition via a sterilization step. In addition, it is possible to adjust the purity of the milk fat and the sugar easily, by processing from ingredients. For that reason, the quality of the cream composition in the present embodiment is more stabilized, for example, than that of the cream composition using fresh milk containing components varying in seasons as its ingredient.

The cream composition in the present embodiment is stable in any storage state, either at freezing or normal temperature, and may be stored for an extended period of time, and thus, can be used as a cream substitute advantageously.

The cream composition in the present embodiment can be used for production of foods and drinks Examples of the foods include cakes. Examples of the drinks include coffee, cocoa, and milk tea. The cream composition can be advantageously used in preparation of cakes using a large amount of fresh cream. Examples of the cakes include cake, tiramisu, pudding, whip cream, and ice cream. In preparation of such foods and drinks, for example, part of conventional fresh cream may be replaced with the cream composition in the present embodiment. Thus, the cream composition in the present embodiment does not cause large change in the taste and flavor of the foods and drinks to which the cream composition is applied, and thus, can be used for production of foods and drinks preserving the conventional taste and flavor.

EXAMPLES

Hereinafter, the present embodiment will be described more specifically with reference to Examples and Comparative Examples.

Examples 1 to 6 and Comparative Example 1

In Examples 1 to 6 and Comparative Example 1, the following components shown in Table 1 were mixed in the preparation step and agitated into a cream composition, and the cream composition was retort-sterilized ($F_0$ value: ca. 7) in the sterilization step, to obtain 3 kg of a cream composition. In Examples 3 to 5 and Comparative Example 1, the mixture was homogenized into a cream composition in a homogenizer (HV-OH-3-3.7S, manufactured by Izumi Food Machinery Co., Ltd.) under the condition of 200 L/hour and 200 kg/cm in the homogenization step, after the preparation step and before the sterilization step.

In the following Tables, the unit for the columns showing the kinds of components and for the columns for water content and total solid content is mass %. In the following Tables, "S570" represents an emulsifier 5570 manufactured by Mitsubishi-Kagaku Foods Corporation, and the "cream" represents "Takanashi Frozen Cream (trade name)" available from Takanashi Milk Products Co., Ltd. In the "cream" column, the value not in parenthesis shows the content of the cream in the cream composition. The value in the parenthesis corresponding to "(milk fat)" shows the content of milk fat in the cream composition, while the value in the parenthesis corresponding to "(nonfat milk solid)" the content of the nonfat milk solid, i.e., the content of the cream-derived solid other than milk fat, in the cream composition. The content of water in the cream composition is shown in the "water content" column. The term "high" in the "agitation" column means that the cream composition was agitated by using a stirrer manufactured by Aiho Co., Ltd. at a frequency of 3,440 rpm, and the term "low" at a frequency of 60 rpm. The term "yes" in the "homogenization" column indicates presence of a homogenization step, while the term "no", absence of the homogenization step. The cream composition obtained in each Example and Comparative Example was measured or evaluated on the following items. The results are summarized in Table 1.

Median Diameter

The median diameter of the cream composition in each Example and Comparative Example was determined by laser diffraction/scattering method. The median diameter of the cream composition under three different conditions, after storage under a 30° C. atmosphere for 4 weeks, after storage under a normal-temperature (20° C.) atmosphere for 7 days, and after storage under a −18° C. atmosphere for 4 days and thawing to normal temperature (20° V), were determined. The column for the "median diameter (μm) after storage at 30" C" in the following Tables shows the median diameter of the cream composition after storage under the 30° C. atmosphere for 4 weeks. The column for the "median diameter (μm) after storage at normal temperature" shows the median diameter of the cream composition determined after storage in the normal-temperature atmosphere for 7 days. The column for the "median diameter (μm) after storage under freezing" shows the median diameter of the cream composition determined after storage under the −18° C. atmosphere and then thawing to normal temperature (20° C.). The symbol "-" in these columns means that the median diameter of cream composition in the column was not measured.

Viscosity

Fifty ml of the cream composition in each Example and Comparative Example was placed in a beaker (internal diameter: 36 mm) having a capacity of 50 ml, and the viscosity thereof at 20° C. was determined by using a type 1B viscometer (rotor: No. 2, rotor rotational frequency: 30 rpm, measurement period: 1 minute). The viscosity of the cream composition in two conditions, after storage under normal-temperature (a temperature of about 20° C.) atmosphere and after storage under −18° C. atmosphere for 4 days and thawing to normal temperature (20° C.), was determined. In the following Tables, the column of the "viscosity (mPa·s) after storage at normal temperature" shows the viscosity of the cream composition measured in the normal-temperature atmosphere, while the column of "viscosity (mPa·s) after storage under freezing" the viscosity of the cream composition determined after storage under the −18° C. atmosphere and thawing to normal temperature (20° C.). The symbol "-" means that the viscosity of the cream composition in the column was not measured.

Handleability

The handleability of the cream composition in each Example and Comparative Example was evaluated. The handleability of the cream composition in three states, after storage under a 30° C. atmosphere, after storage in a 6.0° C. atmosphere, and after storage under a −18.0° C. atmosphere, was determined. In the following Tables, the "handleability (30° C.)" column shows the handleability of the cream composition determined after storage under a 30° C. atmosphere. The "handleability (6° C.)" column shows the handleability of the cream composition determined after storage under a 6° C. atmosphere. The "handleability (−18° C.)" column shows the handleability of the cream composition determined after storage under a −18° C. atmosphere. In these columns, "1" (Superior) means that the cream composition was sufficiently superior in flowability and there was no floatation or sedimentation of the components such as milk fat visually observed. "2" (Good) means that the cream composition was high in flowability, but there was floatation or sedimentation of the components such as milk fat recognizable by visual observation, and "3" (Slightly unfavorable) means that the cream composition was lower in flowability but there was no floatation or sedimentation of the components such as milk fat recognizable by visual observation. "4" (Unfavorable) means that the cream composition is lower in flowability and floatation or sedimentation of the components such as milk fat was recognized by visual observation. The symbol "-" means that the handleability of the cream composition in the column was not measured.

TABLE 1

|  | Ex. | | | | | | Comp. Ex. |
| --- | --- | --- | --- | --- | --- | --- | --- |
|  | 1 | 2 | 3 | 4 | 5 | 6 | 1 |
| Sucrose (sugar) | 51.9 | 51.5 | 51.9 | 51.5 | 51.2 | 51.2 | — |
| Cream | 32.9 | 32.9 | 32.9 | 32.9 | 32.9 | 32.9 | 32.9 |
| (Milk fat) | (15.5) | (15.5) | (15.5) | (15.5) | (15.5) | (15.5) | (15.5) |
| (Nonfat milk solid) | (1.5) | (1.5) | (1.5) | (1.5) | (1.5) | (1.5) | (1.5) |
| S570 | — | 0.4 | — | 0.4 | 0.7 | 0.7 | — |
| Water | 15.2 | 15.2 | 15.2 | 15.2 | 15.2 | 15.2 | 67.1 |
| Water content | 31.1 | 31.1 | 31.1 | 31.1 | 31.1 | 31.1 | 83.0 |
| Total solid content | 68.9 | 68.9 | 68.9 | 68.9 | 68.9 | 68.9 | 17.0 |
| Agitation | High | High | High | High | High | High | High |
| Homogenization | No | No | Yes | Yes | Yes | No | Yes |
| Median diameter (μm) After storage at normal temperature | 2.77 | 1.53 | 1.56 | 1.15 | 1.57 | 1.96 | 16.50 |
| Median diameter (μm) After storage under freezing | — | — | 1.42 | — | 1.61 | — | 14.93 |

TABLE 1-continued

|  | Ex. | | | | | | Comp. Ex. |
|---|---|---|---|---|---|---|---|
|  | 1 | 2 | 3 | 4 | 5 | 6 | 1 |
| Viscosity (mPa·s) After storage at normal temperature | 207 | 235 | 263 | 239 | 318 | 317 | 21 |
| Viscosity (mPa·s) After storage under freezing | — | — | — | — | 365 | — | 15 |
| Handleability (30° C.) | 2 | 2 | 1 | 1 | 1 | 1 | 2 |
| Handleability (6° C.) | 2 | 2 | 2 | 2 | 1 | 1 | — |
| Handleability (−18° C.) | — | — | 2 | 1 | 1 | 1 | 4 |

As shown in Table 1, it was possible to obtain cream compositions superior in handleability in each temperature atmosphere in Examples 1 to 6. Thus, it was found that the cream composition in each Example was superior in handleability and could be handled easily under any atmosphere at freezing, refrigerating, or normal temperature. In addition, comparison of the results in Examples 1 and 3 and those in Examples 2 and 4 reveals that the handleability of a cream composition was improved by homogenization of the cream composition prepared. The results in Examples 3 to 6 also showed that it was possible to improve the handleability of the cream composition by adding an emulsifier and increasing the amount of the emulsifier added, independently of the presence of the homogenization treatment.

On the other hand, the cream composition in Comparative Example 1, which contains no sugar and has a median diameter and a viscosity outside the favorable range above, was lower in handleability, in particular in the handleability under the −18° C. atmosphere, than those in Examples.

Examples 7 to 13 and Comparative Examples 2 and 3

Cream compositions were prepared in a similar manner to Examples 1 to 6 and Comparative Example 1 in Examples 7 to 13 and Comparative Examples 2 and 3, except that the components for the cream compositions were changed to those shown in Table 2 and all of the cream compositions were homogenized. In the following Tables, the "butter" indicates a commercially available common desalted butter, and the "vegetable oil", a commercially available common vegetable oil. The value not in parenthesis in the "butter" column shows the content of the butter in the cream composition. The value in the parenthesis corresponding to "(milk fat)" shows the content of milk fat in the cream composition, while the value in the parenthesis corresponding to "(nonfat milk solid)", the content of the nonfat milk solid, i.e., the content of the cream-derived solid other than milk fat, in the cream composition. The "skim milk powder" and the "whole milk powder" were respectively products of Snow Brand Milk Products Co., Ltd. The cream composition obtained in each Example and Comparative Example was measured or evaluated on the following items. The results are summarized in Table 2.

TABLE 2

|  | Ex. | | | | | | | Comp. Ex. | |
|---|---|---|---|---|---|---|---|---|---|
|  | 7 | 8 | 9 | 10 | 11 | 12 | 13 | 2 | 3 |
| Sucrose (sugar) | 42.5 | 48.2 | 48.2 | 51.2 | 51.2 | 51.2 | 51.2 | 51.2 | 51.2 |
| Cream | 56.8 | 32.9 | 32.9 | 22.3 | 22.3 | 11.7 | — | 16.5 | — |
| (Milk fat) | (26.7) | (15.5) | (15.5) | (10.5) | (10.5) | (5.5) |  | (7.7) |  |
| (Nonfat milk solid) | (2.6) | (1.5) | (1.5) | (1.0) | (1.0) | (0.5) |  | (0.7) |  |
| Butter | — | — | — | — | — | — | 18.5 | — | — |
| (Milk fat) |  |  |  |  |  |  | (15.5) |  |  |
| (Nonfat milk solid) |  |  |  |  |  |  | (0.4) |  |  |
| Vegetable oil | — | — | — | 5.0 | — | — | — | — | — |
| Skim milk powder | — | 3.0 | — | — | 5.0 | 10.0 | — | — | 15.5 |
| whole milk powder | — | — | 3.0 | — | — | — | — | — | — |
| S570 | 0.7 | 0.7 | 0.7 | 0.7 | 0.7 | 0.7 | 0.7 | 0.7 | 0.7 |
| Water | — | 15.2 | 15.2 | 20.8 | 20.8 | 26.4 | 29.6 | 31.6 | 32.6 |
| Water content | 27.5 | 31.1 | 31.1 | 31.6 | 31.6 | 32.1 | 32.2 | 39.7 | 32.6 |
| Total solid content | 72.5 | 68.9 | 68.9 | 68.4 | 68.4 | 67.9 | 67.8 | 60.3 | 67.4 |
| Agitation | High | High | High | High | High | High | High | High | High |
| Homogenization | Yes | Yes | Yes | Yes | Yes | Yes | Yes | Yes | Yes |
| Median diameter (μm) After storage at 30° C. | — | — | — | — | 0.72 | 0.97 | — | — | — |
| Median diameter (μm) After storage at normal temperature | 2.57 | 0.59 | 0.83 | 0.51 | — | — | 2.74 | 0.93 | — |
| Median diameter (μm) After storage under freezing | — | 0.62 | 0.91 | — | 0.81 | 1.00 | 2.78 | — | — |

TABLE 2-continued

|  | Ex. | | | | | | | Comp. Ex. | |
| --- | --- | --- | --- | --- | --- | --- | --- | --- | --- |
|  | 7 | 8 | 9 | 10 | 11 | 12 | 13 | 2 | 3 |
| Viscosity (mPa · s) After storage at normal temperature | 766 | 475 | 412 | 2015 | 484 | 556 | 214 | 77 | — |
| Viscosity (mPa · s) After storage under freezing | — | 651 | 471 | — | 412 | 559 | 242 | — | — |
| Handleability (30° C.) | 1 | 1 | 1 | 1 | 1 | 1 | 2 | 1 | 4 |
| Handleability (6° C.) | 1 | 1 | 1 | 1 | — | — | — | 2 | 4 |
| Handleability (−18° C.) | 1 | 1 | 1 | 1 | 1 | 1 | 1 | 4 | 4 |

As shown in Table 2, it was possible to obtain cream compositions superior in handleability in each temperature atmosphere in Examples 7 to 13. Thus, the cream composition in each Example was superior in handleability and could be handled easily under any atmosphere at freezing, refrigerating, or normal temperature.

On the other hand, the cream composition in Comparative Example 2, which has a total solid content lower than that of the other cream compositions and a viscosity outside the favorable range above, was lower in handleability, in particular in the handleability under the −18° C. atmosphere, than those in Examples. The cream composition in Comparative Example 3, which contains no milk fat, was lower in handleability than those in the Examples under all temperature atmospheres.

Further, the properties of the cream composition of Example 13 after storage at normal temperature for 9 months were shown to be almost identical with those of the cream composition immediately after preparation. The results showed that the cream composition of Example 13 had superior storage stability.

Example 14 and Comparative Example 4

Cream compositions were prepared in a similar manner to Examples 1 to 6 and Comparative Example 1 in Example 14 and Comparative Example 4, except that the components for the cream compositions were changed to those shown in Table 3 and only the cream composition of Example 14 was homogenized. The cream compositions of Example 14 and Comparative Example 4 were measured or evaluated on the test items above. The results are summarized in Table 3.

TABLE 3

|  | Ex. 14 | Comp. Ex. 4 |
| --- | --- | --- |
| Sucrose (sugar) | 51.2 | 51.2 |
| Cream | 32.9 | 32.9 |
| (Milk fat) | (15.5) | (15.5) |
| (Nonfat milk solid) | (1.5) | (1.5) |
| S570 | 0.7 | 0.7 |
| Water | 15.2 | 15.2 |
| Water content | 31.1 | 31.1 |
| Total solid content | 68.9 | 68.9 |
| Agitation | Low | Low |
| Homogenization | Yes | No |
| Median diameter (μm) After | 0.96 | 7.16 |

TABLE 3-continued

|  | Ex. 14 | Comp. Ex. 4 |
| --- | --- | --- |
| storage at normal temperature |  |  |
| Viscosity (mPa · s) After storage at normal temperature | 251 | 361 |
| Handleability (30° C.) | 1 | 2 |
| Handleability (6° C.) | 2 | 3 |

As shown in Table 3, it was possible to obtain cream compositions superior in handleability in each temperature atmosphere in Example 14. Thus, the cream composition of Example 14 was superior in handleability and could be handled easily under any atmosphere at freezing, refrigerating, or normal temperature.

On the other hand, the cream composition of Comparative Example 4, which has a median diameter outside the favorable range above, was lower in handleability than that of Example 14.

Examples 15 to 25 and Comparative Examples 5 to 11

Cream compositions were prepared in a similar manner to Examples 1 to 6 and Comparative Example 1 in Examples 15 to 25 and Comparative Examples 5 to 11, except that the components for the cream compositions were changed to those shown in Tables 3 and 4 and all of the cream compositions were homogenized. The cream composition in Example 16 was treated with UHT sterilization ($F_0$ value: ca. 7), replacing retort sterilization in the sterilization step. In the following Tables, "DE" indicates dextrin (DE: ca. 8) available from Futamura Chemical Co., Ltd. The cream composition obtained in each Example and Comparative Example was measured or evaluated on the following items. The results are summarized in Tables 4 and 5. In Examples 16 to 22, the cream compositions after storage for nine months were measured or evaluated on the test items under the condition shown in Table 6. The handleability of the cream compositions of Examples 16 to 22 was evaluated under an atmosphere of 30° C. The results are summarized in Table 6.

TABLE 4

| | Ex. | | | | | | | | | | |
|---|---|---|---|---|---|---|---|---|---|---|---|
| | 15 | 16 | 17 | 18 | 19 | 20 | 21 | 22 | 23 | 24 | 25 |
| Sucrose (sugar) | 61.2 | 52 | 52 | 51.2 | 48.2 | 45.2 | 48.2 | 48.2 | 46.2 | 42.5 | 40.0 |
| DE | — | — | — | — | 3.0 | 6.0 | — | — | — | — | — |
| Cream | 11.7 | 39.4 | 39.4 | 32.9 | 32.9 | 32.9 | 32.9 | 32.9 | 32.9 | 56.8 | 56.8 |
| (Milk fat) | (5.5) | (18.5) | (18.5) | (15.5) | (15.5) | (15.5) | (15.5) | (15.5) | (15.5) | (26.7) | (26.7) |
| (Nonfat milk solid) | (0.5) | (1.8) | (1.8) | (1.5) | (1.5) | (1.5) | (1.5) | (1.5) | (1.5) | (2.6) | (2.6) |
| Skim milk powder | — | — | — | — | — | — | — | 3.0 | — | — | — |
| whole milk powder | — | — | — | — | — | — | — | — | 3.0 | — | — |
| S570 | 0.7 | 0.7 | 0.7 | 0.7 | 0.7 | 0.7 | 0.7 | 0.7 | 0.7 | 0.7 | 0.7 |
| Water | 26.4 | 7.9 | 7.9 | 15.2 | 15.2 | 15.2 | 15.2 | 15.2 | 20.2 | 0 | 2.5 |
| Water content | 32.1 | 27.0 | 27.0 | 31.1 | 31.1 | 31.1 | 31.1 | 31.1 | 36.1 | 27.5 | 30.0 |
| Total solid content | 67.9 | 73.0 | 73.0 | 68.9 | 68.9 | 68.9 | 68.9 | 68.9 | 63.9 | 72.5 | 70.0 |
| Agitation | High | High | High | High | High | High | High | High | High | High | High |
| Homogenization | Yes | Yes | Yes | Yes | Yes | Yes | Yes | Yes | Yes | Yes | Yes |
| Median diameter (μm) After storage at 30° C. | 0.38 | — | — | — | — | — | — | — | 0.58 | — | 1.64 |
| Median diameter (μm) After storage at normal temperature | — | 1.25 | 0.84 | 1.57 | 1.12 | 2.90 | 0.59 | 0.83 | — | 2.57 | — |
| Median diameter (μm) After storage under freezing | 0.38 | — | — | 1.61 | 1.13 | 2.95 | 0.62 | 0.91 | 0.58 | — | 1.61 |
| Viscosity (mPa·s) After storage at normal temperature | 300 | 577 | 750 | 318 | 362 | 380 | 475 | 412 | 139 | 766 | 432 |
| Viscosity (mPa·s) After storage under freezing | 337 | — | — | 365 | 368 | 387 | 651 | 471 | 140 | — | 407 |
| Handleability (30° C.) | 1 | 1 | 1 | 1 | 1 | 1 | 1 | 1 | 1 | 1 | 1 |
| Handleability (6° C.) | — | 1 | 1 | 1 | — | — | 1 | 1 | — | 1 | 1 |
| Handleability (−18° C.) | 1 | 1 | 1 | 1 | 1 | 1 | 1 | 1 | 1 | 1 | 1 |

TABLE 5

| | Comp. Ex. | | | | | | |
|---|---|---|---|---|---|---|---|
| | 5 | 6 | 7 | 8 | 9 | 10 | 11 |
| Sucrose (sugar) | 40.0 | 30.0 | 25.6 | 25.6 | — | — | — |
| DE | — | — | 20.5 | — | 41.0 | — | — |
| Cream | 32.9 | 32.9 | 32.9 | 32.9 | 32.9 | 32.9 | 32.9 |
| (Milk fat) | (15.5) | (15.5) | (15.5) | (15.5) | (15.5) | (15.5) | (15.5) |
| (Nonfat milk solid) | (1.5) | (1.5) | (1.5) | (1.5) | (1.5) | (1.5) | (1.5) |
| S570 | 0.7 | 0.7 | 0.7 | 0.7 | 0.7 | — | 0.7 |
| Water | 25.7 | 36.4 | 20.3 | 40.8 | 25.4 | 67.1 | 66.4 |
| Water content | 42.3 | 52.3 | 36.2 | 56.7 | 41.3 | 83.0 | 82.3 |
| Total solid content | 57.7 | 47.7 | 63.8 | 43.3 | 58.7 | 17.0 | 17.7 |
| Agitation | High | High | High | High | High | High | High |
| Homogenization | Yes | Yes | Yes | Yes | Yes | Yes | Yes |
| Median diameter (μm) After storage at normal temperature | 1.33 | 1.44 | 8.30 | 1.43 | 11.63 | 16.50 | 0.89 |
| Median diameter (μm) After storage under freezing | 0.74 | 1.46 | — | — | — | 14.93 | — |
| Viscosity (mPa·s) After storage at normal temperature | 71 | 32 | 1520 | 23 | 3122 | 21 | 15 |
| Viscosity (mPa·s) After storage under freezing | 79 | 29 | — | — | — | 15 | — |
| Handleability (30° C.) | 1 | 1 | 1 | 2 | 1 | 2 | 2 |
| Handleability (6° C.) | — | — | 2 | 2 | 2 | — | 2 |

TABLE 5-continued

|  | Comp. Ex. | | | | | | |
|---|---|---|---|---|---|---|---|
|  | 5 | 6 | 7 | 8 | 9 | 10 | 11 |
| Handleability (−18° C.) | 2 | 4 | — | — | — | 4 | 4 |

TABLE 6

|  | Ex. | | | | | | |
|---|---|---|---|---|---|---|---|
|  | 16 | 17 | 18 | 19 | 20 | 21 | 22 |
| Median diameter (μm) After storage at 30° C. for 9 months | 1.07 | 0.83 | 1.18 | 1.35 | 3.19 | 0.56 | 0.92 |
| Median diameter (μm) After storage at 6° C. for 9 months | — | 0.93 | — | — | — | — | — |
| Median diameter (μm) After storage under freezing for 9 months | 1.29 | 0.93 | — | — | — | — | — |
| Viscosity (mPa·s) After storage at 30° C. for 9 months | 548 | 589 | 308 | 337 | 336 | 541 | 375 |
| Viscosity (mPa·s) After storage at 6° C. for 9 months | — | 642 | — | — | — | — | — |
| Viscosity (mPa·s) After storage under freezing for 9 months | 579 | 659 | — | — | — | — | — |
| Handleability (30° C.) | 1 | 1 | 1 | 1 | 1 | 1 | 1 |
| Handleability (6° C.) | — | 1 | — | — | — | — | — |
| Handleability (−18° C.) | 1 | 1 | — | — | — | — | — |

As shown in Table 4, it was possible to obtain cream compositions superior in handleability in each temperature atmosphere in Examples 15 to 25. Thus, the cream composition of each Example was superior in handleability and could be handled easily under any atmosphere at freezing, refrigerating, or normal temperature.

On the other hand, as shown in Table 5, some of the cream compositions of Comparative Examples 5 to 11 contained no sugars. Also, in some of these cream compositions, the sugar content, the median diameter, or a viscosity are outside the favorable range above. Thus, these cream compositions were lower in handleability than those of Examples 15 to 25.

As shown in Table 6, the cream compositions of Examples 16 to 22 were superior in handleability. The properties of the cream compositions of Examples 16 to 22 after storage for nine months were shown to be almost identical with those of the cream composition immediately after preparation. The results showed that the cream compositions of Examples 16 to 22 were superior in storage stability. The taste and flavor of the cream compositions after storage were also examined and found to be slightly unfavorable than those immediately after preparation, but the deterioration of the flavor was in the range that there was no problem in using the cream composition.

Example 26 and Comparative Examples 12 to 18

Cream compositions were prepared in a similar manner to Examples 1 to 6 and Comparative Example 1 in Example 26 and Comparative Examples 12 to 18, except that the components for the cream compositions were changed to those shown in Table 7 and all of the cream compositions were not homogenized. The cream composition obtained in each Example and Comparative Example was measured or evaluated on the following items. The results are summarized in Table 7.

TABLE 7

|  | Ex. | Comp. Ex. | | | | | | |
|---|---|---|---|---|---|---|---|---|
|  | 26 | 12 | 13 | 14 | 15 | 16 | 17 | 18 |
| Sucrose (sugar) | 51.2 | 25.6 | 25.6 | — | — | 51.2 | 51.2 | 44.5 |
| DE | — | — | 20.5 | — | 41.0 | — | — | — |
| Cream | 32.9 | 32.9 | 32.9 | 32.9 | 32.9 | 32.9 | 32.9 | — |
| (Milk fat) | (15.5) | (15.5) | (15.5) | (15.5) | (15.5) | (15.5) | (15.5) | (8.1) |
| (Nonfat milk solid) | (1.5) | (1.5) | (1.5) | (1.5) | (1.5) | (1.5) | (1.5) | (20.9) |
| S570 | 0.7 | 0.7 | 0.7 | 0.7 | 0.7 | 0.7 | 0.7 | — |
| Water | 15.2 | 40.8 | 20.3 | 66.4 | 25.4 | 15.2 | 15.2 | 0.4 |
| Water content | 31.1 | 56.7 | 36.2 | 82.3 | 41.3 | 31.1 | 31.1 | 26.5 |

TABLE 7-continued

|  | Ex. | Comp. Ex. | | | | | | |
| --- | --- | --- | --- | --- | --- | --- | --- | --- |
|  | 26 | 12 | 13 | 14 | 15 | 16 | 17 | 18 |
| Total solid content | 68.9 | 43.3 | 63.8 | 17.7 | 58.7 | 68.9 | 68.9 | 73.5 |
| Agitation | High | High | High | High | High | High | Low | Low |
| Homogenization | No | No | No | No | No | No | No | No |
| Median diameter (μm) After storage at 30° C. | — | — | — | — | — | — | — | 2.10 |
| Median diameter (μm) After storage at normal temperature | 1.96 | 4.87 | 8.42 | 12.31 | 7.88 | 7.16 | 17.45 | — |
| Median diameter (μm) After storage under freezing | — | — | — | — | — | — | — | 2.11 |
| Viscosity (mPa·s) After storage at normal temperature | 317 | 26 | 940 | 16 | 4709 | 361 | 377 | 2639 |
| Viscosity (mPa·s) After storage under freezing | — | — | — | — | — | — | — | 3023 |
| Handleability (30° C.) | 1 | 2 | 2 | 2 | 1 | 2 | 2 | 3 |
| Handleability (6° C.) | 1 | 2 | 2 | 2 | 2 | 3 | 3 | — |
| Handleability (−18° C.) | 1 | — | — | 4 | — | — | — | 3 |

As shown in Table 7, it was possible to obtain a cream composition superior in handleability in each temperature atmosphere in Example 26. Thus, the cream composition of Example 26 was superior in handleability and could be handled easily under any atmosphere at freezing, refrigerating, or normal temperature.

On the other hand, the cream compositions of Comparative Examples 12 to 18, which contained no sugar or had a median diameter or a viscosity outside the favorable range above, were lower in handleability than that of Example 26. The cream composition of Comparative Example 18 is commercially available, as a common condensed milk. Condensed milk is normally produced by concentration of milk, and thus, adjustment of the milk fat content therein is more difficult than that in the cream composition in the present embodiment. In addition, the condensed milk is produced before the result of microbial test on the dairy ingredient is known in order to preserve the freshness of condensed milk. As a result, if the result of microbial test is unfavorable, the condensed milk produced should be disposed of.

For examination of the possibility of deterioration in the handleability of cream composition due to floatation or sedimentation of the milk fat when the cream composition is stored for an extended period of time, for example, the cream composition is centrifuged. When there is floatation or sedimentation of milk fat in the cream composition observed after centrifugation, there is a possibility of the deterioration in the handleability of cream composition when the cream composition is stored for an extended period of time.

Thus, the cream compositions in each Example in two states: a state where the composition is stored under the normal-temperature (20° C.) atmosphere used for evaluation of the median diameter for 7 days and a state where the composition is stored under a −18° C. atmosphere for 4 days and then thawed to normal temperature (20° C.), were centrifuged respectively, and the cream compositions after centrifugation were observed visually. Although detailed results are omitted, the cream composition in any state showed some floatation of the milk fat together with increase in the centrifugal force in Examples 8, 9, 16, 17, 21, and 22. The cream composition stored under normal-temperature atmosphere showed some floatation of the milk fat together with increase in the centrifugal force in Example 20. The cream compositions in any state showed no floatation and sedimentation of the milk fat in Examples 5, 6, 13, 18, 19, and 26. There was some floatation of the milk fat under the 30° C. atmosphere in Example 13.

The results above indicated that the cream compositions of Examples 13 and 20 showed superior handleability for an extended period of time at normal temperature or low temperature. And the cream compositions of Examples 5, 6, 18, 19, and 26 showed superior handleability for an extended period of time at normal temperature and also at low temperature. Thus, it was possible to obtain a cream composition having superior handleability for an extended period of time under the normal-temperature or low-temperature atmosphere by adjusting the viscosity of cream composition in the range of 200 to 400 mPa·s. It was also possible to obtain a cream composition having superior handleability for an extended period of time under the temperature atmosphere to which the cream composition is normally exposed, by adjusting the median diameter in the range of 1.0 to 2.0 μm.

The cream composition of each Comparative Example was also centrifuged in a similar manner to the cream composition in each Example. Although detailed results are omitted, there was at least floatation or sedimentation of the milk fat after centrifugation in each Comparative Example.

Example 27 and Comparative Example 19

In Example 27, 104 g of sucrose (sugar), 79 g of cream (milk fat: 47 mass %, nonfat milk solid: 4.5 mass %), and 17 g of water were blended and agitated under a 75° C. atmosphere for 2 minutes by a stirrer in the preparation step, to obtain a cream composition. The milk fat content of the cream composition of Example 27 was 18.5 mass %, while the sugar content was 52 mass %, the median diameter was 1.25 μm, and the viscosity at 20° C. was 577 mPa·s.

In Comparative Example 19, 79 g of cream (milk fat: 47 mass %, nonfat milk solid: 4.5%) and 17 g of water were blended and agitated under a 75° C. atmosphere for 2 minutes by a stirrer in the preparation step, to obtain a cream composition.

The cream composition obtained in each Example and Comparative Example was analyzed in a vibration test. Specifically, the cream composition in each Example and Comparative Example was placed in a container, and the container connected to a shaker. After the container was shaken with the shaker, the properties of the cream composition in the container were observed visually. The container was shaken under the condition of a shaking period of 4 minutes, a shaking width of 3 cm, and a shaking direction and a number of vertical direction and 600 times.

As a result, the cream composition of Example 27 showed no separation of the components after the vibration test. Thus, the cream composition of Example 27 was shown to be stable even when it was vibrated vigorously. On the other hand, there was separation of oil and aqueous layers in the cream composition of Comparative Example 19 after the vibration test, indicating that it was lower in stability than the cream composition of Example 27.

Examples 28 to 43

Cream compositions were prepared in Examples 28 to 43 in a similar manner to Examples 1 to 6 and Comparative Example 1, except that the components for the cream compositions were changed to those shown in Tables 8 and 9 and all of the cream compositions were homogenized. Vegetable oils manufactured by Fuji Oil Co., Ltd. were used as the vegetable oils in the following Tables. In the following Tables, the "emulsifier S570", "emulsifier S770", and "emulsifier P1670" were respectively emulsifiers S570, S770, and P1670 manufactured by Mitsubishi-Kagaku Foods Corporation. The emulsifiers S570 and S770 are sucrose stearate esters, and the hydrophilic-hydrophobic balance (HLB) of the emulsifier S570 was "5" and that of S770, "7". The emulsifier P1670 is a sucrose palmitate ester, and the HLB of P1670 was "16". The cream composition obtained in each Example and Comparative Example was measured or evaluated on the following items. The results are summarized in Tables 8 and 9.

TABLE 8

| | Ex. | | | | | | | |
|---|---|---|---|---|---|---|---|---|
| | 28 | 29 | 30 | 31 | 32 | 33 | 34 | 35 |
| Sucrose (sugar) | 47.0 | 47.0 | 47.0 | 47.0 | 47.0 | 47.0 | 47.0 | 47.0 |
| Cream | 39.4 | 39.4 | 39.4 | 39.4 | 39.4 | 39.4 | 39.4 | 39.4 |
| (Milk fat) | (18.5) | (18.5) | (18.5) | (18.5) | (18.5) | (18.5) | (18.5) | (18.5) |
| (Nonfat milk solid) | (1.8) | (1.8) | (1.8) | (1.8) | (1.8) | (1.8) | (1.8) | (1.8) |
| Vegetable oil (palm oil) | 5.0 | — | 5.0 | — | — | 5.0 | — | 5.0 |
| Vegetable oil (rapeseed oil) | — | 5.0 | — | 5.0 | 5.0 | — | 5.0 | — |
| Vegetable oil (coconut oil) | — | — | — | — | — | — | — | — |
| Emulsifier S570 | — | — | 0.7 | 0.7 | — | — | — | — |
| Emulsifier S770 | — | — | — | — | 0.7 | — | — | — |
| Emulsifier S1670 | — | — | — | — | — | 0.7 | 0.7 | — |
| Emulsifier (Organic acid monoglyceride) | — | — | — | — | — | — | — | 0.7 |
| Water | 8.7 | 8.7 | 8.0 | 8.0 | 8.0 | 8.0 | 8.0 | 8.0 |
| Water content | 27.7 | 27.7 | 27.0 | 27.0 | 27.0 | 27.0 | 27.0 | 27.0 |
| Total solid content | 72.3 | 72.3 | 73.0 | 73.0 | 73.0 | 73.0 | 73.0 | 73.0 |
| Agitation | High | High | High | High | High | High | High | High |
| Homogenization | Yes | Yes | Yes | Yes | Yes | Yes | Yes | Yes |
| Median diameter (μm) | 2.59 | 1.32 | 3.09 | 1.69 | 2.05 | 0.70 | 0.75 | 2.77 |
| After storage at normal temperature Viscosity (mPa·s) | 979 | 574 | 1394 | 872 | 796 | 671 | 517 | 1433 |
| After storage at normal temperature Handleability (30° C.) | 2 | 2 | 1 | 1 | 2 | 1 | 1 | 2 |
| Handleability (6° C.) | 2 | 2 | 1 | 1 | 2 | 1 | 1 | 2 |
| Handleability (−18° C.) | 1 | 1 | 1 | 1 | 1 | 1 | 1 | 1 |

TABLE 9

| | Ex. | | | | | | | |
|---|---|---|---|---|---|---|---|---|
| | 36 | 37 | 38 | 39 | 40 | 41 | 42 | 43 |
| Sucrose (sugar) | 47.0 | 47.0 | 47.0 | 47.0 | 47.0 | 47.0 | 47.0 | 47.0 |
| Cream | 39.4 | 39.4 | 39.4 | 39.4 | 39.4 | 34.3 | 29.3 | 24.3 |
| (Milk fat) | (18.5) | (18.5) | (18.5) | (18.5) | (18.5) | (16.1) | (13.8) | (11.4) |
| (Nonfat milk solid) | (1.8) | (1.8) | (1.8) | (1.8) | (1.8) | (1.6) | (1.3) | (1.1) |
| Vegetable oil (palm oil) | — | — | — | 5.0 | 5.0 | 10.0 | 15.0 | 20.0 |
| Vegetable oil (rapeseed oil) | 5.0 | — | — | — | — | — | — | — |

TABLE 9-continued

|  | Ex. | | | | | | | |
| --- | --- | --- | --- | --- | --- | --- | --- | --- |
|  | 36 | 37 | 38 | 39 | 40 | 41 | 42 | 43 |
| Vegetable oil (coconut oil) | — | 5.0 | 5.0 | — | — | — | — | — |
| Emulsifier S570 | — | 0.7 | — | — | — | — | — | — |
| Emulsifier S1670 | — | — | 0.7 | — | — | 0.7 | 0.7 | 0.7 |
| Emulsifier (Organic acid monoglyceride) | 0.7 | — | — | — | — | — | — | — |
| Emulsifier (Polyglycerin ester) | — | — | — | 0.7 | — | — | — | — |
| Emulsifier (Sorbitan ester) | — | — | — | — | 0.7 | — | — | — |
| Water | 8.0 | 8.0 | 8.0 | 8.0 | 8.0 | 8.0 | 8.0 | 8.0 |
| Water content | 27.0 | 27.0 | 27.0 | 27.0 | 27.0 | 24.6 | 22.2 | 19.8 |
| Total solid content | 73.0 | 73.0 | 73.0 | 73.0 | 73.0 | 75.4 | 77.8 | 80.2 |
| Agitation | High | High | High | High | High | High | High | High |
| Homogenization | Yes | Yes | Yes | Yes | Yes | Yes | Yes | Yes |
| Median diameter (μm) After storage at normal temperature | 3.74 | 1.48 | 0.68 | 1.78 | 1.44 | 0.71 | 0.64 | 0.61 |
| Viscosity (mPa·s) After storage at normal temperature | 2144 | 296 | 314 | 391 | 382 | 359 | 639 | 1236 |
| Handleability (30° C.) | 2 | 1 | 1 | 1 | 1 | 1 | 1 | 2 |
| Handleability (6° C.) | 2 | 1 | 1 | 1 | 1 | 1 | 1 | 1 |
| Handleability (−18° C.) | 1 | 1 | 1 | 1 | 1 | 1 | 1 | 1 |

As shown in Tables 8 and 9, it was possible to obtain cream compositions superior in handleability in each temperature atmosphere in Examples 28 to 43. Thus, the cream composition of each Example was superior in handleability and could be handled easily under any atmosphere at freezing, refrigerating, or normal temperature. The results in Examples 28 to 29 and those in Examples 30 and 31 showed that it was possible to improve the handleability of cream composition by properly selecting the kind of emulsifier added when a vegetable oil was added. For example, the results in Example 28 and those in Examples 33, 35, 39, and 40 showed that it was possible to reduce the viscosity of cream composition by adding a properly selected kind of emulsifier.

Application to Foods

Tiramisu, vanilla ice cream, pudding, whip cream, and coffee were prepared by using a cream composition. The cream composition used was a cream composition prepared in a similar manner to Examples 1 to 6 and Comparative Example 1 except that it was homogenized, and the composition of the cream composition is as follows: milk fat: 18.5 mass %, nonfat milk solid: 1.8 mass %, sucrose (sugar): 52.0 mass %, emulsifier (S570, available from Mitsubishi-Kagaku Foods Corporation): 0.7 mass %, and water 27.0 mass %. The cream composition was stored under a 20° C. atmosphere for 16 days and at normal temperature (20° C.) as it was contained in a PET (polyethylene terephthalate) container, and additionally stored as it was frozen under a −18° C. atmosphere for 19 days. The cream composition after storage was thawed as it was left under a normal-temperature (20° C.) atmosphere, and the thawed cream composition was used for preparation of foods (hereinafter, referred to as type-1 cream composition).

Separately, a cream composition similarly prepared was stored as frozen, as it was contained in a PET (polyethylene terephthalate) container under a −18° C. atmosphere for 35 days. The freeze-stored cream composition was thawed at 20° C. and used for preparation of foods (hereinafter, referred to as type-2 cream composition).

The median diameter of the type-1 cream composition during use was 1.09 μm, and the viscosity at 20° C. was 668 mPa·s.

The median diameter of the type-2 cream composition during use was 1.24 μm, and the viscosity at 20° C. was 571 mPa·s.

Example 44 and Comparative Example 20

Tiramisu

In Example 44 and Comparative Example 20, a tiramisu was prepared by using the materials shown in Table 10. The type-1 cream composition was used in Example 44. The materials indicated by "∘" in Table 10 were placed in a pot and brought to boil, to obtain a syrup. Then, a sponge cake was cut to pieces suitable in size to be placed in a cup, placed in a cup, and the syrup was allowed to penetrate into the sponge cake while the syrup was still hot.

Then, in Example 44, egg yolk was beaten until almost white in a bowl, and Mascarpone cooled to room temperature (20° C.) was added to the bowl and mixed gently. Separately in Comparative Example 20, egg yolk and sugar were beaten until almost white in a bowl, and Mascarpone cooled to room temperature (20° C.) was added to the bowl and mixed gently.

In Comparative Example 20, lightly whipped fresh cream was mixed with the Mascarpone to obtain a cream for tiramisu, whereas in Example 44, a combination of fresh cream and the cream composition was lightly whipped and mixed to obtain a cream for tiramisu. Each of the tiramisu cream prepared was allowed to penetrate into the sponge above, and the sponge was cooled in a refrigerator for 2 to 3 hours. And, a tiramisu was prepared by sprinkling with cocoa powder immediately before serving.

TABLE 10

|  | Ex. 44 | Comp. Ex. 20 |
| --- | --- | --- |
| Egg yolk, size L | 51 g | 51 g |
| (calculated as 17 g/piece) | (3 pieces) | (3 pieces) |
| Sugar | — | 70 g |
| Mascarpone | 250 g | 250 g |
| Fresh cream | 145 g | 200 g |
| Cream composition | 135 g | — |
| Sponge cake | One | One |
| Water | 100 g | 100 g |
| Instant coffee | 10 g | 10 g |
| Sugar | 20 g | 20 g |
| Kahlua liqueur | 10 g | 10 g |
| Cocoa powder | Suitable amount | Suitable amount |

A total of three tiramisus, one tiramisu of Example 44 and two pieces of tiramisu of Comparative Example 20, were evaluated sensorily according to the three-point identification method specified by Japanese Industrial Standard (JIS) Z 9080: 2004, "Sensory analysis—Methodology". In the three-point identification method, which also corresponds to International Standard ISO 4120: 1983 "Sensory analysis, Methodology, Triangle test", raters select one different food out of three foods, and its probability is tested by binomial distribution, with respect to the accidental correct selection probability of 1/3. Fifteen raters among 32 raters selected the correct tiramisu in the test by the three-point identification method, and thus, the tiramisu of Example 44 was judged to be unidentifiable at a significance level of 5% from the tiramisu of Comparative Example 20. The results in the three-point identification method by using the tiramisu of Example 44 and Comparative Example 20 showed that the cream composition according to the present invention did not exert any influence on the taste and flavor of the tiramisu.

The type-1 cream composition was used in the tiramisu of Example 44. It was shown that there was no change in physical properties or quality of the cream composition according to the present invention and the cream composition can be used in foods, even after storage at normal temperature for a particular period and then under freezing.

Example 45 and Comparative Example 21

Vanilla Ice Cream

In Example 45 and Comparative Example 21, vanilla ice creams were prepared by using the materials shown in Table 11. The type-1 cream composition was used in Example 45. In Comparative Example 21, milk, fresh cream, sugar, and vanilla essence were placed and blended in a bowl, to obtain a mixture. In Example 45, sugar and part of the fresh cream prepared in Comparative Example 21 were used, replacing the cream composition, and blended to obtain a mixture. Then, the mixture was added gradually into a bowl containing agitated egg yolk, and the mixture was further agitated, to obtain an ice cream ingredient preparation. The ice cream ingredient preparation was placed in a metal container. Then, the ice cream ingredient preparation was placed in a freezer for 3 to 4 hours, and the ice cream ingredient preparation was removed from the freezer and agitated, when it became solidified. The operation was repeated several times, to obtain a vanilla ice cream.

TABLE 11

|  | Ex. 45 | Comp. Ex. 21 |
| --- | --- | --- |
| Milk | 300 g | 300 g |
| Fresh cream | 237 g | 300 g |
| Sugar | — | 80 g |
| Egg yolk, size L | 51 g | 51 g |
| (calculated as 17 g/piece) | (3 pieces) | (3 pieces) |
| Vanilla essence | 0.2 g | 0.2 g |
| Cream composition | 154 g | — |

A total of three vanilla ice creams, one ice cream of Example 45 and two ice creams of Comparative Example 21, were evaluated sensorily, in a similar manner to Example 44 and Comparative Example 20. Sixteen raters out of 32 raters selected the correct vanilla ice cream in the test by the three-point identification method, indicating that the vanilla ice cream of Example 45 was unidentifiable from the vanilla ice cream of Comparative Example 21 at a significance level of 10%. The results by the three-point identification method by using the vanilla ice creams of Example 45 and Comparative Example 21 showed that the cream composition according to the present invention did not exerted any influence on the taste and flavor of vanilla ice cream.

Example 46 and Comparative Example 22

Pudding

In Example 46 and Comparative Example 22, puddings were prepared by using the ingredients shown in Table 12. The type-1 cream composition was used in Example 46. The materials indicated by "○" in Table 12 were placed and blended in a pot, and heated to approximately 50° C., to obtain a pudding mixture. Then, the pudding mixture was added in small portions to egg yolk agitated without foaming. Then, vanilla essence was added to the pudding mixture, the pudding mixture was filtered, and the filtrate was placed in a heat-resistant container. The foams on the surface of the pudding composition was removed, and the heat resistant container was capped and steam-baked in an oven at 170° C. for about 30 minutes, to obtain a pudding.

TABLE 12

|  | Ex. 46 | Comp. Ex. 22 |
| --- | --- | --- |
| Egg yolk, size L | 68 g | 68 g |
| (calculated as 17 g/piece) | (4 pieces) | (4 pieces) |
| Milk | 250 g | 250 g |
| Fresh cream | 202.5 g | 250 g |
| Granulated sugar | — | 60 g |
| Vanilla essence | 0.2 g | 0.2 g |
| Cream composition | 115 g | — |

A total of three puddings, two pudding of Example 46 and one puddings of Comparative Example 22, were evaluated sensorily, in a similar manner to Example 44 and Comparative Example 20. Five raters out of 20 raters selected the correct pudding in the test by the three-point identification method, indicating that the pudding of Example 46 was unidentifiable from the pudding of Comparative Example 22. The results by the three-point identification method by using the puddings of Example 46 and Comparative Example 22 showed that the cream composition according to the present invention did not exert any influence on the taste and flavor of pudding.

Examples 47 and 48 and Comparative Examples 23 and 24

Whip Cream

In Examples 47 and 48 and Comparative Examples 23 and 24, whip creams were prepared by using the ingredients shown in Table 13. The type-1 cream composition was used in Example 47. The type-2 cream composition was used in Example 48. An animal-derived fresh cream was used entirely in Comparative Example 23, while a vegetable whip cream was used entirely in Comparative Example 24. The ingredients shown in Table 13 were placed in a bowl, and the mixture was whipped to the soft peak stage with an electric mixer, to obtain a whip cream.

TABLE 13

|  | Ex. 47 | Ex. 48 | Comp. Ex. 23 | Comp. Ex. 24 |
|---|---|---|---|---|
| Fresh cream (animal-derived fat) | 184 g | 184 g | 200 g | — |
| Whip cream (vegetable-derived fat) | — | — | — | 200 g |
| Granulated sugar | — | — | 20 g | 20 g |
| Cream composition | 38.5 g | 38.5 g | — | — |

Each of the whip creams of Examples 47 and Example 48, and Comparative Examples 23 and 24 was evaluated sensorily by four-point quality rating method. In the four-point quality rating method, raters select a sample identical with a desirable sample (Comparative Example 23) out of four kinds of whip creams. The rater is correct when the rater selects a sample identical with the desirable sample. Six raters out of 20 raters were collect in the test by the four-point quality rating method, and thus the collect answer rate was 30%. The difference in quality of the whip cream, which contained a smaller number of added ingredients, seemed to be distinguished more easily. However, the results of the test by four-point quality rating method by using the whip creams of Examples 47 and 48 showed that the cream composition according to the present invention exerted almost no influence on the taste and flavor of the whip cream. As for tastiness, many raters were fond of the whip creams of Examples 47 and 48, as they feel a density higher than that of fresh cream. When the whip cream of Example 47 is compared with that of Example 48, the whip cream of Example 47 tasted sweeter, and there was almost no difference in quality and physical properties, although it was slightly yellowish in color.

Examples 49 and 50 and Comparative Example 25

Milk Coffee

In Examples 49 and 50 and Comparative Example 25, milk coffees were prepared from the ingredients shown in Table 14. The type-1 cream composition was used in Examples 49 and 50. The unit of the values in the columns showing the kinds of ingredients in Table 14 is g/L. A coffee extract having a Brix of 2.8%, prepared by hot water extraction of pure Arabica coffee beans at approximately 95° C., was used. "P1670" and "S570" represent emulsifiers P1670 and S570 manufactured by Mitsubishi-Kagaku Foods Corporation.

TABLE 14

|  | Ex. 49 | Ex. 50 | Comp. Ex. 25 |
|---|---|---|---|
| Coffee extract | 440.0 | 440.0 | 440.0 |
| Sugar | 46.8 | 51.8 | 57.1 |
| Milk | 0 | 52.5 | 105.0 |
| Baking soda | 0.9 | 0.9 | 0.9 |
| Cream composition | 19.8 | 9.9 | 0 |
| Skim milk powder | 8.9 | 4.5 | 0 |
| P1670 | 0.3 | 0.3 | 0.3 |
| S570 | 0.02 | 0.09 | 0.15 |

The milk coffees of Examples 49 and 50 and Comparative Example 25 were evaluated sensorily by a three-point comparative test. In the three-point comparative test, raters select a sample identical with a desirable sample (Comparative Example 25) out of three kinds of milk coffees. In the three-point comparative test, six raters out of 20 raters selected the collect sample, and thus, the correct answer rate was 30%, indicating that the milk coffees of Examples 49 and 50 were less identifiable from the milk coffee of Comparative Example 25. The results in the test by the three-point identification method by using the milk coffees of Examples 49 and 50 and Comparative Example 25 showed that the cream composition according to the present invention did not exert any influence on the taste and flavor of milk coffee. The tastiness was also evaluated, but the results differed significantly, depending on the rater.

What is claimed is:

1. A method for producing a cream composition having a flowability at −18° C., comprising:
    mixing milk fat, a sugar, and water to prepare a mixture containing 10 to 25 mass of milk fat and 40 to 65 mass % of sugar;
    agitating the mixture at 1,000 rpm or more to produce an agitated mixture;
    homogenizing the agitated mixture with a homogenizer to obtain an obtained cream composition having a median diameter of 0.2 to 4.0~tm and a viscosity at 20° C. of 100 to 2,500 mPa's;
    sterilizing the obtained cream composition; and
    flowing the cream composition at 18° C.

2. The method according to claim 1, further comprising storing the obtained cream composition at a temperature of −18° C. or lower.

3. The method according to claim 1, wherein said mixing is performed such that the obtained cream composition has a solid content of 60 to 78 mass %.

4. The method according to claim 1, wherein the sugar is sucrose.

5. The method according to claim 1, further comprising adjusting the pH of the cream composition to more than 6.5 prior to said sterilizing.

6. The method according to claim 1, wherein said mixing comprises further adding an emulsifier to the mixture.

7. The method according to claim 6, wherein the emulsifier is a glycerol fatty acid ester, a sucrose fatty acid ester, a sorbitan fatty acid ester, a propylene glycol fatty acid ester, polysorbate, or lecithin.

8. The method according to claim 1, wherein said agitating and homogenizing are performed such that the obtained cream composition has a median diameter of 1.0 to 2.0 μm.

9. The method according to claim 1, wherein said agitating and homogenizing are performed such that the obtained cream composition has a viscosity at 20° C. of 200 to 400 mPa·s.

10. The method according to claim 1, wherein the sugar is contained in the mixture in an amount of 45 to 55 mass % of the mixture.

11. A method for producing a cream composition having a flowability at −18° C., comprising:
mixing milk fat, sucrose, a sucrose fatty acid ester, and water to prepare a mixture containing 10 to 25 mass % of milk fat and 45 to 55 mass % of sucrose;
agitating the mixture at 1,000 rpm or more to produce an agitated mixture;
homogenizing the agitated mixture with a homogenizer to obtain an obtained cream composition having a median diameter of 1.0 to 2.0 μm and a viscosity at 20° C. of 200 to 400 mPa's;
adjusting the pH of the obtained cream composition to more than 6.5;
sterilizing the obtained cream composition, the pH of which has been adjusted to more than 6.5;
storing the cream composition at a temperature of −18° C. or lower; and
flowing the cream composition at 18° C.

12. A method for producing a cream composition having a flowability at −18° C., comprising:
mixing milk fat, a sugar, and water to prepare a mixture containing 10 to 25 mass % of milk fat and 40 to 65 mass % of sugar;
agitating the mixture at 1,000 rpm or more to obtain an agitated cream composition having a median diameter of 0.2 to 4.0 μm and a viscosity at 20° C. of 100 to 2,500 mPa's;
adjusting the pH of the obtained cream composition to more than 6.5;
sterilizing the obtained cream composition, the pH of which has been adjusted to more than 6.5; and
flowing the cream composition at 18° C.

* * * * *

UNITED STATES PATENT AND TRADEMARK OFFICE
CERTIFICATE OF CORRECTION

PATENT NO. : 8,652,558 B2  
APPLICATION NO. : 13/452440  
DATED : February 18, 2014  
INVENTOR(S) : Takaki Goto, Seiichiro Ikeda and Kumiko Hiramatsu Page 1 of 1

It is certified that error appears in the above-identified patent and that said Letters Patent is hereby corrected as shown below:

In the Claims

Col. 26, line 41, in Claim 1, delete "mPa's;" and insert -- mPa.s; ; --, therefor.

Col. 27, line 14, in Claim 11, delete "mPa's;" and insert -- mPa.s; --, therefor.

Col. 28, line 12, in Claim 12, delete "mPa's;" and insert -- mPa.s; --, therefor.

Signed and Sealed this  
Twenty-seventh Day of May, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,652,558 B2  
APPLICATION NO. : 13/452440  
DATED : February 18, 2014  
INVENTOR(S) : Takaki Goto, Seiichiro Ikeda and Kumiko Hiramatsu Page 1 of 1

It is certified that error appears in the above-identified patent and that said Letters Patent is hereby corrected as shown below:

In the Claims

Col. 26, line 41, in Claim 1, delete "mPa's;" and insert -- mPa·s; ; --, therefor.

Col. 27, line 14, in Claim 11, delete "mPa's;" and insert -- mPa·s; --, therefor.

Col. 28, line 12, in Claim 12, delete "mPa's;" and insert -- mPa·s; --, therefor.

This certificate supersedes the Certificate of Correction issued May 27, 2014.

Signed and Sealed this  
Sixteenth Day of September, 2014

Michelle K. Lee  
*Deputy Director of the United States Patent and Trademark Office*